Figure 1:
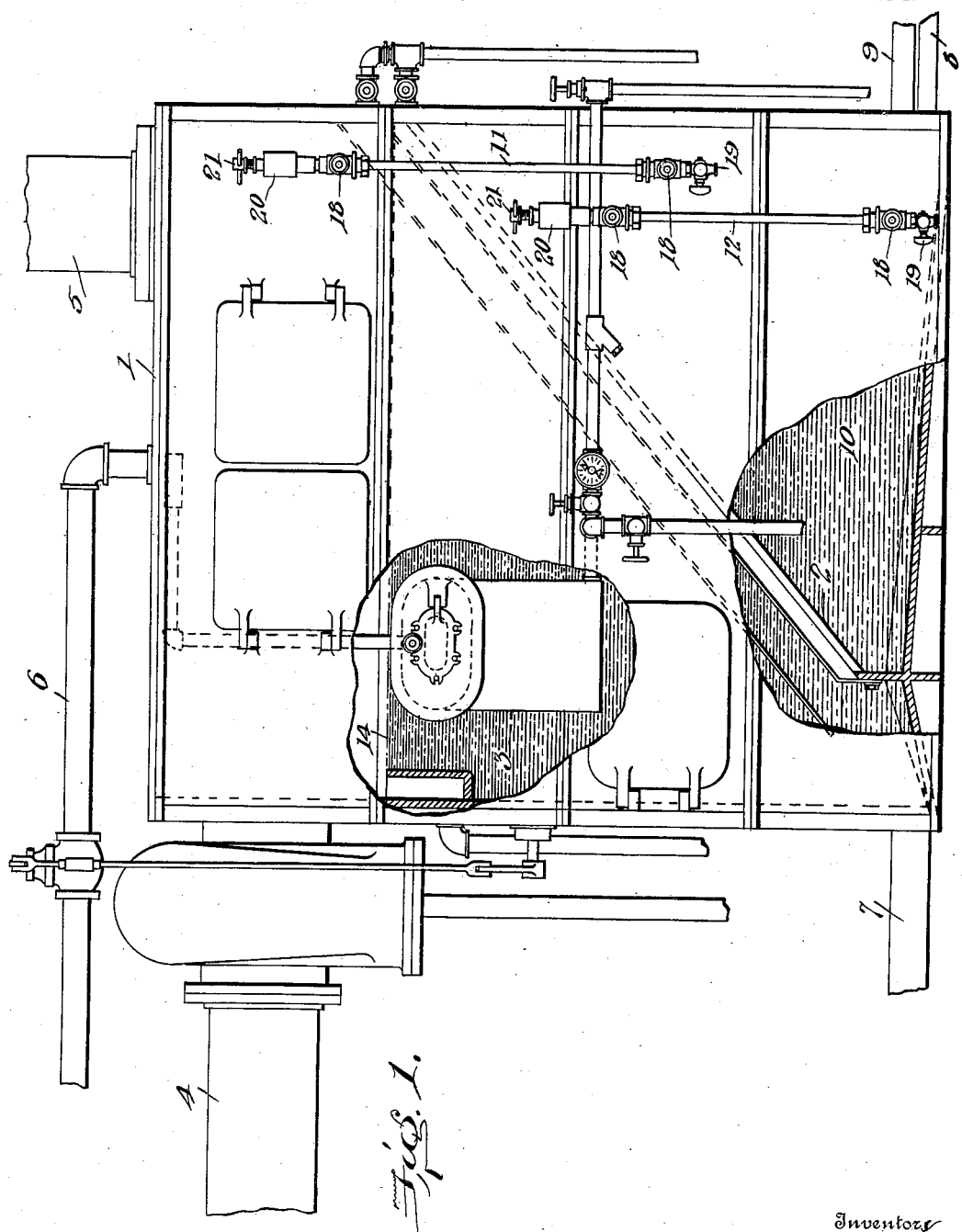

No. 861,551. PATENTED JULY 30, 1907.

O. L. STUMP, J. REIDENBAUGH & E. D. PACKARD.
WATER PURIFYING APPARATUS.
APPLICATION FILED JUNE 22, 1906.

2 SHEETS—SHEET 1.

Witnesses
G. Howard Walmsley.
H. L. Hemmaker.

Inventors
Oman L. Stump,
John Reidenbaugh,
Edwin D. Packard,

By H. A. Toulmin.
Attorney

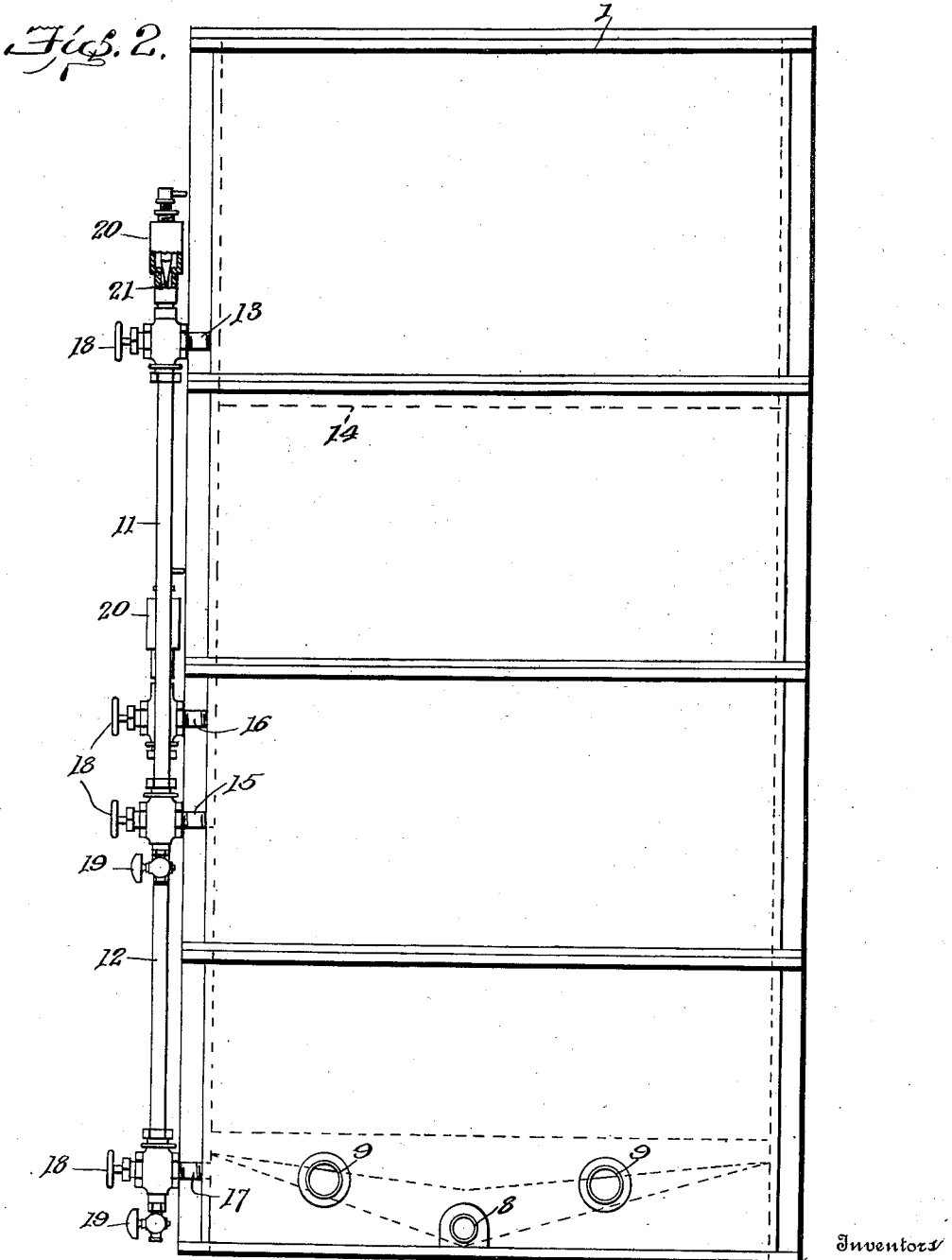

UNITED STATES PATENT OFFICE.

OMAN L. STUMP, JOHN REIDENBAUGH, AND EDWIN D. PACKARD, OF MARION, OHIO, ASSIGNORS TO THE MARION INCLINE FILTER AND HEATER COMPANY, OF MARION, OHIO, A CORPORATION OF OHIO.

WATER-PURIFYING APPARATUS.

No. 861,551.   Specification of Letters Patent.   Patented July 30, 1907.

Application filed June 22, 1906. Serial No. 322,910.

*To all whom it may concern:*

Be it known that we, OMAN L. STUMP, JOHN REIDENBAUGH, and EDWIN D. PACKARD, citizens of the United States, residing at Marion, in the county of Marion and State of Ohio, have invented certain new and useful Improvements in Water-Purifying Apparatus, of which the following is a specification, reference being had therein to the accompanying drawings.

This invention relates to improvements in water purifying apparatus, and the object of the invention is to provide an apparatus for quickly and accurately determining, visually or by observation, the quantity of reagent solution contained in the water in the apparatus, and to make this test as to the water in the lower and upper parts of the purifying apparatus equally well, so as to ascertain the condition of the water with respect to the quantity of the chemical solution therein throughout the whole depth of the water in the apparatus.

The means for accomplishing this object consist in connecting transparent or glass test tubes to the purifying apparatus so that the water in the apparatus will flow into these tubes, the tubes to embrace the whole depth of the water and each tube to show the condition of the water in that part of the depth thereof along which the tube extends. These tubes are supplied with receptacles containing phenol pthalin, a purplish red liquid, so known on the market, being in substance one of the phenols; and by admitting a small quantity, a drop or so, of this liquid into the test tubes, the water therein is immediately colored into a reddish shade, the particular shade depending upon the quantity of soda-ash solution, (the reagent used), in the water in the apparatus and in the tubes. We have ascertained by experience that when the phenol pthalin turns the water from its natural color, (which is not affected by the soda-ash solution) to a pink or pinkish red, then the quantity of solution in the water under treatment in the purifier is exactly sufficient to cause the impurities of the water to collect and is insufficient to be hurtful to the boilers in which the water is to be used. Thus, by this color test we are enabled to determine when an excess of the chemical solution is present, when a deficiency is present, and when the proper quantity is in the water under treatment, and we are enabled to ascertain these several conditions throughout the depth of the body of water in the apparatus, for experience shows that the water may not be in the same condition as to the quantity of chemical solution therein in the upper part of the purifier as in the lower, or vice versa.

In the accompanying drawings, we have illustrated that part of our invention embraced in the apparatus, and which apparatus constitutes one means of practicing the process.

In these drawings, Figure 1 is a side elevation, broken away in part, of a water purifying apparatus showing our invention applied thereto; and Fig. 2 is an end elevation of the same.

The numeral 1 designates the casing of a water purifying apparatus of any approved type, preferably a purifier in which is embodied a filtering medium 2, arranged as set forth in Letters Patent granted to one of us, namely, Oman L. Stump, on the 23rd day of January, 1906, No. 810,441, for improvements in feed water heaters, and a chemical tank or vessel 3 which by preference is located within the purifier as set forth in an application filed by us of even date herewith Ser. No. 322,911. But it will be understood that the purifier with which the present invention may be used may be otherwise built or arranged, though the one indicated is that preferred. This purifier has an exhaust steam inlet 4 and an outlet 5, a cold water supply pipe 6, a blow-off pipe 7 for carrying away collected impurities, lime, etc., a washout pipe 8 for carrying off sediment, and a pure water supply pipe 9 leading from the filtered water compartment 10 of the purifier to the feed pump of the boiler. This apparatus is equipped with our test tubes shown at 11 and 12, the former connecting with the interior of the purifier by the pipe 13 at a point above the normal water line, indicated by the dotted line 14, and by the pipe 15 at a suitable point lower down on the purifier; and the latter pipe is connected to the purifier by the pipe 16 at a point above the connection 15 and again by a pipe 17 down near the bottom of the purifier. Thus the whole altitude of the water is embraced by these communications of the test tubes with the purifier, the connection 13 of the upper tube being high enough to insure communication with the water at an abnormal elevation. These communications of the test tubes with the interior of the purifier are controlled by valves or cocks 18 so that they may be opened and closed at will. Each tube also has a discharge faucet 19 for purposes of draining it when desired. Each tube is further provided with a cup or vessel 20 for containing the coloring chemical or material, the phenol pthalin being preferred, though an equivalent would be within the range of this invention. Each of these cups has an outlet controlled by a needle valve 21, as indicated in Fig. 2, so that the desired quantity of the chemical or material may be discharged into the tube. These tests are made at intervals, say, of an hour or so, or otherwise according to the regulations that may be adopted by different users. As the test tubes communicate with the interior water at different elevations, the condition of the water as to the quantity of the reagent solution therein, at these different heights, may be tested. It is found in practice that owing to the size of these apparatus the solution may be sufficient in one portion and insufficient in another, or in excess in some part and deficient or of the right quantity in other parts. It is to cover the whole range that we have organized our test tubes in the manner indicated. This condition of inequality in the distribution of the chemical reagent and in the quantity of it is due to conditions arising in use. For instance, suppose the amount of the chemical were exactly right at the bottom of the purifier, but that the feed water had stopped, or the strength of the chemical in the tank had become so weakened that the feed of the chemical therefrom should be increased. In this condition a test of the water near the bottom of the purifier would mislead as to the condition of the water near the top of the purifier or an intermediate point remote from the bottom. But by our invention the test may be applied at different altitudes and hence interior conditions may be determined at different altitudes. We have described two tubes, but it is obvious that they may be otherwise in number, above or below, so long as practically the whole depth of the water is embraced by the communications between the tube and the interior of the purifier.

It will be observed that the test tubes 11 and 12 incidentally indicate the height of the water in the purifier just as is done by the glass tubes of water gages. This function is incidentally performed by these test tubes.

We would further observe that while we have described the tubes as constituting the transparent device through which to observe the action of the coloring material and the condition of the water, still we do not wish to be confined to tubes, as our invention comprehends any transparent surface that will retain the water but will permit observation of the water in the purifier.

Having thus fully described our invention, what we claim as new and desire to secure by Letters Patent, is:—

1. In a color test appliance for determining the proper quantity of reagent supplied to a chemical water purifier, the combination of a transparent device in communication with the water in said purifier, means at each end of said device for positively controlling said communication, and a cup or vessel for the coloring material mounted upon said apparatus above said transparent device and adapted to discharge said coloring material into the water.

2. In a color test appliance for determining the proper quantity of reagent supplied to a chemical water purifier, the combination of a transparent device in communication with the water in said purifier at different altitudes, and a cup or vessel for the coloring material mounted upon said apparatus above said transparent device and adapted to discharge it into the water under observation.

3. In a color test appliance for determining the proper quantity of reagent supplied to a chemical water purifier, the combination of a transparent tube communicating with the water purifier at different altitudes, and a cup or vessel for the coloring material adapted to discharge it into the water in the tube.

4. In a color test appliance for determining the proper quantity of reagent supplied to a chemical water purifier, the combination of a transparent tube communicating with the purifier at different altitudes, and a cup or vessel for the coloring material mounted on the tube and having a needle valve.

5. In a color test appliance for determining the proper quantity of reagent supplied to a chemical water purifier, the combination of a plurality of transparent tubes communicating with the interior of the purifier at various points embracing the altitude of the water, each tube having a cup or vessel for containing the coloring material.

In testimony whereof, we affix our signatures in presence of two witnesses.

OMAN L. STUMP.
JOHN REIDENBAUGH.
EDWIN D. PACKARD.

Witnesses:
CARL T. BAUMAN,
ROBERT G. LUCAS.